United States Patent [19]

Kato et al.

[11] Patent Number: 4,826,102
[45] Date of Patent: May 2, 1989

[54] APPARATUS FOR FEED-OUT OF LEADING FILM END FROM ROLL FILM CARTRIDGE

[75] Inventors: Osami Kato, Kanagawa; Takanori Saito, Kawasaki, both of Japan

[73] Assignee: Minolta Camera Kabushiki Kaisha, Osaka, Japan

[21] Appl. No.: 932,201

[22] Filed: Nov. 18, 1986

[30] Foreign Application Priority Data

Nov. 21, 1985 [JP] Japan .................................. 60-262072
Jan. 24, 1986 [JP] Japan .................................. 61-13495
Apr. 19, 1986 [JP] Japan .................................. 61-90957
Jul. 24, 1986 [JP] Japan .................................. 61-174418

[51] Int. Cl.⁴ ........................ G03B 1/02; G11B 15/32
[52] U.S. Cl. ..................................... 242/192; 242/175
[58] Field of Search ..................... 242/192, 197, 195; 360/95; 355/75; 352/72, 74

[56] References Cited

U.S. PATENT DOCUMENTS

| | | | |
|---|---|---|---|
| 3,561,852 | 2/1971 | Krumbein et al. | 242/192 X |
| 3,620,472 | 11/1971 | Thevenaz | 242/192 |
| 3,819,129 | 6/1974 | Thevenaz et al. | 242/192 |
| 4,408,732 | 10/1983 | Toriumi et al. | 242/192 |

Primary Examiner—Stuart S. Levy
Assistant Examiner—Steven M. duBois
Attorney, Agent, or Firm—Burns, Doane, Swecker & Mathis

[57] ABSTRACT

A roll film feed-out apparatus of the present invention has a pressure roller which rotates freely in obedience to the movement of the film. The pressure roller, which is pressed against the film surface when film feed-out operation is executed, enhances the reliability of the film feed-out operation.

10 Claims, 12 Drawing Sheets

FIG.I PRIOR ART
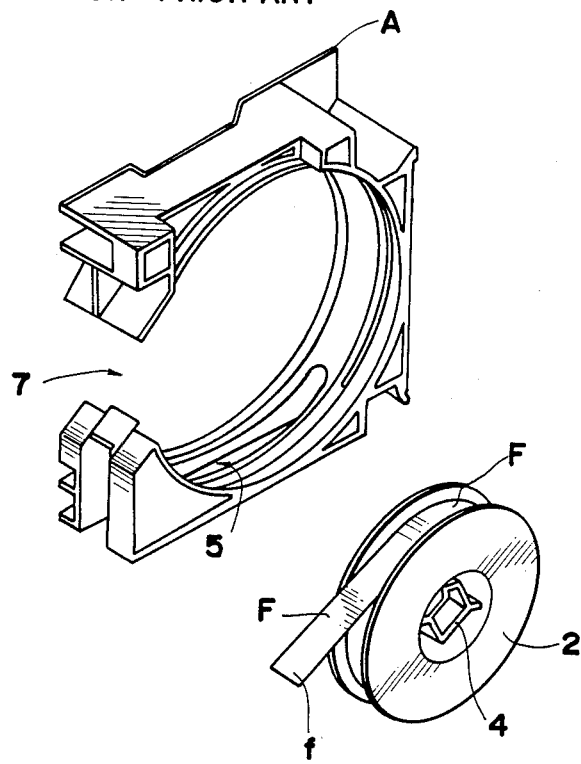
FIG.2 PRIOR ART
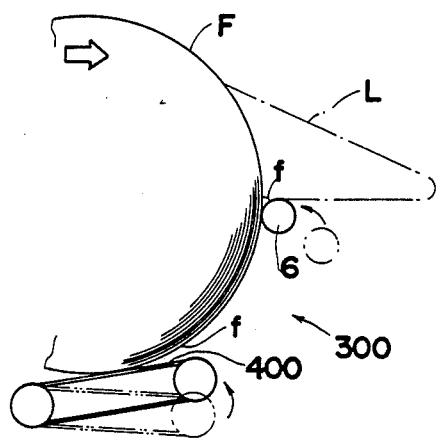

APPARATUS FOR FEED-OUT OF LEADING FILM END FROM ROLL FILM CARTRIDGE

BACKGROUND OF THE INVENTION

1. Field of the Invention

The invention relates to improvements in and relating to an apparatus for feed-out of a leading film end from roll film cartridge and more particularly, it relates to the machines of the above kind, wherein a microfilm strip adopted for use in a film reader/printer is fed-out from the cartridge.

2. Description of the Prior Art

Such cartridges as designed and arranged in coincidence with the standards of ANSI (American National Standards Institution, Inc.), as being only schematically shown at "A" in FIG. 1, have been utilized rather broadly. Such known apparatuses for feed-out of the leading end of a carrier portion of the roll film contained in the cartridge "A" has a structure and function to be set forth hereinbelow.

More specifically, as is shown in FIG. 2, the conventional leading end feed-out apparatus as at 300 is provided with a feed-out belt 400 which is brought into pressure contact with the film roll "F" in the case of initiation of the feed-out operation for take-out of the leading film end "f" and exclusively serving for bringing a rotational movement of the film roll, or provided with certain roller means and the like in place of the belt. This belt 400 or the like means is subjected to a rotational movement and the like, via a power transmission mechanism from a driving source.

The feed-out means consisting of feed belt 400 or the like is so arranged that it can be brought into pressure contact with the film roll "F" contained in the cartridge "A" from an opposite position to a bottom opening 5 thereof (FIG. 1). On the other hand, there is provided a peel-off roller 6 which serves for separating the leading film end "f" of the rotating film roll "F" from the latter towards the outside. This roller 6 is arranged to perform on- and off-pressure contact with the film mass at the film-feed-out opening 7 (FIG. 1) of cartridge "A".

In use of the foregoing conventional type of film feed-out device so far described and schematically shown with reference numeral 300, a troublesome and grave drawback has been encountered.

More specifically, at first, jamming accidents have been freqently encountered, which means that the leading portion of the film having a leading end "f", describes a large loop as shown by "L" in FIG. 2, causing thus a grave operation trouble to occur. This trouble may be deduced from the conventionally employed, remote and separate arrangement of feed belt 400 and peel-off roller 6. This disadvantageous phenomenon is accentuated with the increase of the film wind-up diameter and when the leading film and is positioned near to the feed belt.

As a second problem, the feed belt and the like require a specific drive source and a related transmission mechanism, thus giving rise to a considerable cost increase as well as a detrimental operation failure.

SUMMARY OF THE INVENTION

An object of the present invention is to provide an improved film leader feed-out mechanism which can assure a positive and failure-proof film feed-out operation.

Another object is to provide the above kind of film-leader feed-out mechanism of highly simplified design and arrangement.

Still another object is to provide an improved mechanism of the above kind and adapted for minimizing the otherwise frequently appearing largely curved and buldge-out formation of film-leader, so as to assure a positive and accurate film feed-out operation.

In order to satisfy the foregoing objects, the inventive film-leader feed-out mechanism is so designed and arranged that necessary access is performed only through a single opening window of the film cartridge in use, to the roll film contained therein.

BRIEF DESCRIPTION OF THE DRAWINGS

These and further objects, features and advantages of the present invention will become more apparent from the following detailed description of the invention taken in conjunction with several preferred embodiments thereof with reference to the accompanying drawings, in which:

FIG. 1 is an exploded perspective view of a conventional roll film cartridge;

FIG. 2 is an enlarged, partial and elevational view of a roll film mass and related film leader feed-out means.

FIG. 8-1 to FIG. 8-3 are schematic views for the illustration of three successive operation steps in the roll film feed-out job.

FIG. 14-1 to FIG. 14-4 are schematic explanatory sketch drawings, illustrating several operational steps in a film feed-out operation from a 3M-type cartridge.

FIG. 15-1 to FIG. 15-4 are similar views to the foregoing FIG. 14-1 to FIG. 14-4, for the illustration of several similar steps with use of an ANSI-type cartridge.

DESCRIPTION OF THE PREFERRED EMBODIMENTS

In the following, several preferred embodiments will be described more in detail with reference to FIGS. 3–21 of the accompanying drawings.

At first, a first embodiment of the present invention will be set forth with reference to FIGS. 3–10.

Figure 3:
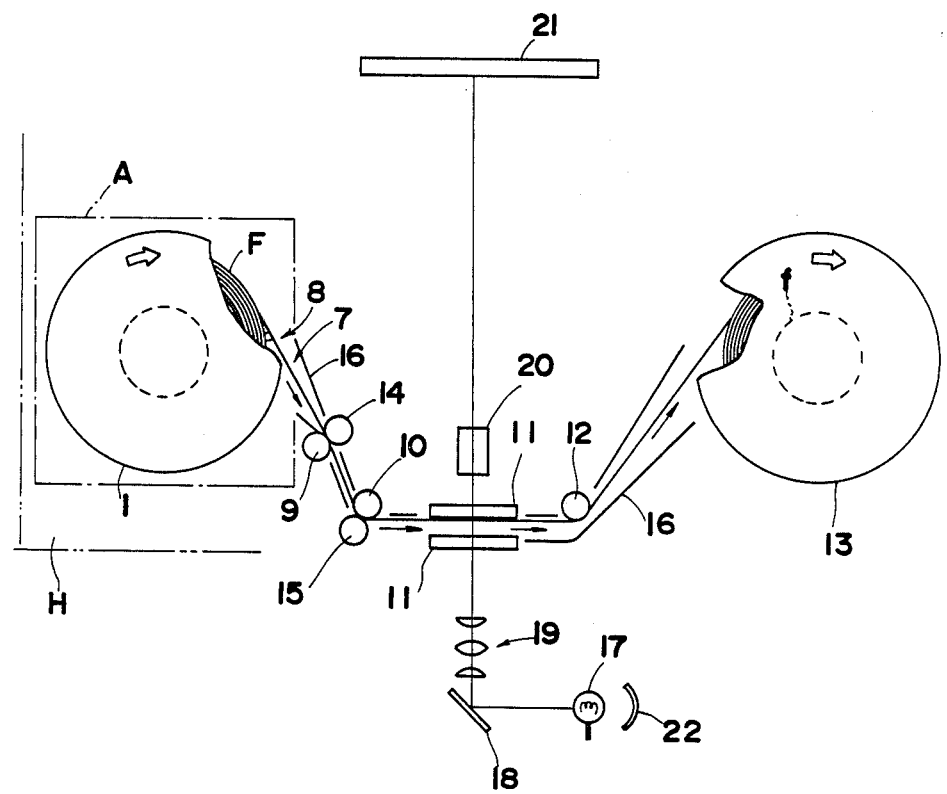
FIG. 3 is an elevational sketch view of a roll film carrier section.

In FIG. 3, a roll film carrier section of a reader/printer is specifically shown.

"A" illustrates generally a cartridge, preferably of ANSI-type, in which a reel 1 is rotatably mounted as conventional. A long film strip, for example, microfilm of roll film type, is wound on the reel. The leading end "f" of the film strip is fed-out to guide roller pair 9; 14 under the action of a conventional feed-out mechanism positioned at 8, although not specifically shown at present. One of these guide rollers as at 9 is a drive roller.

Then, the thus taken-out leading end of film strip "F" is guided between encoder roll pair 10; 15 and further between guide plates 11 and around guide roller 12 and the like, so as to be wound on a separated spool 13.

It should be noted that first and second reels or spools 1 and 13 are arranged as conventional with respective motors, although not shown, for selective execution of a film-rewinding or winding job. Several arrows shown in FIG. 3 illustrate the rewinding stage from first reel 1. There are provided several pressure plates as shown which are, however, denoted with common numeral 11 for simplicity. These pressure plates are made preferably of glass and arranged in pairs, each pair thereof being arranged to establish pressure contact with the film strip from both sides thereof when the latter is brought to a halt.

Roller 14 acts as pressure roller relative to drive roller 9, while roller 15 acts as an auxiliary roller relative to encoder roller proper 10. Numeral 16 represents two separate sets of guide plates or semi-cylinders serving for smoother and better guidance of the film strip "F".

Numeral 17 represents a light source, preferably a lamp as shown, the light passage starting therefrom, together with that reflected from reflector mirror 22, impinging on condenser mirror 18 and being reflected from the latter. The reflected light passage passes through a condenser lens unit, generally shown at 19, and then passingly illuminates the transparent plate section comprising a pair of glass plate elements, which are arranged to allow sliding movement of the film positioned therebetween.

Then, the light passage illuminates recorded images on the film part, corresponding to the plate section 11. These images are projected enlargingly through a conventional projector lens unit 20 onto a viewing screen 21 which is positioned high above the latter.

It may be well understood that the operator can now operate the control panel, not shown, to start either first or second motor, to be described more in detail to first or second reel or spool 1 or 13, for execution of regular or reverse film feed, as wanted upon reviewing the projected images on the screen 21 and for positioning any selected frame image in position relative to the plate section 11. He can now observe his selected film frame image projected on the screen.

Figure 4:
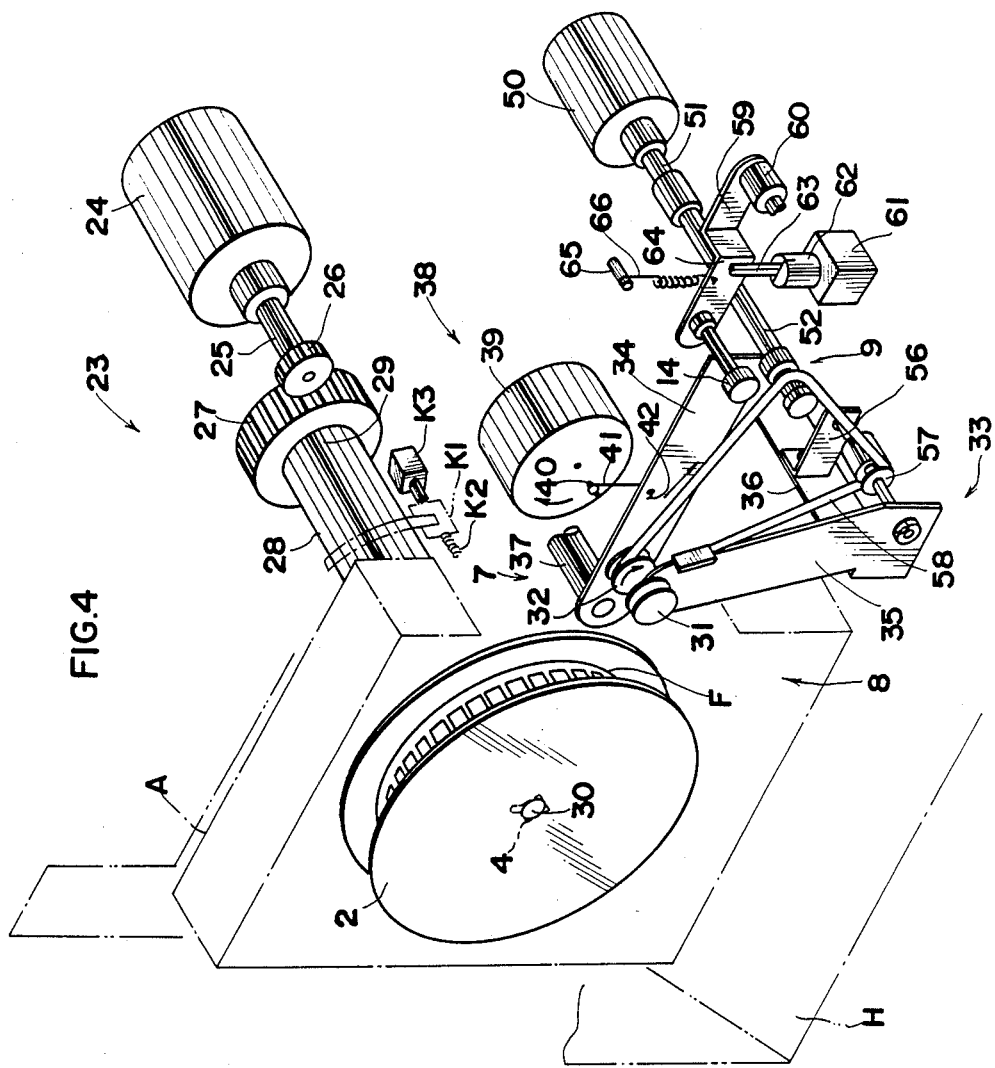
FIG. 4 is an enlarged perspective view of the roll film feed-out mechanism, together with the first reel.
Figure 5:
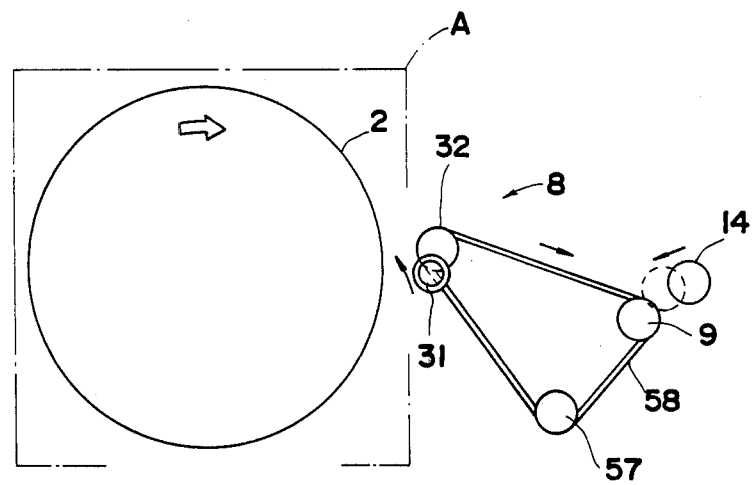
FIG. 5 is a somewhat reduced and schematically simplified elevational view of the arrangement shown in FIG. 4.
Figure 6:
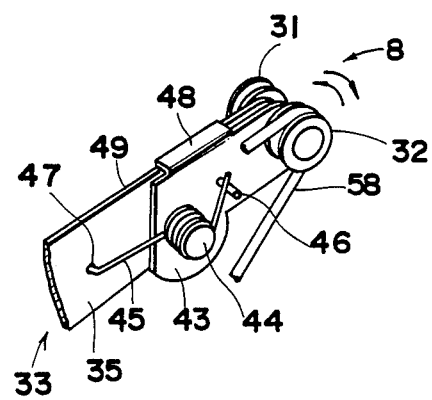
FIG. 6 is a perspective view of a film peel-off and pressure contact roller means employed.

Next, referring to FIGS. 4, 5 and 6, the film leading end feed-out apparatus 8 will be illustrated in detail.

REEL DRIVE MECHANISM 23

Reel drive mechanism 23 is arranged to rotate the first reel 2 for feeding the film strip in its regular and feed-out direction upon energization of the first motor 24, having a motor shaft 25 carrying an output pinion 26 fixedly attached thereon.

An input gear 27 of the mechanism proper is kept in meshing engagement with said motor output pinion. The gear 27 is attached fixedly to root end 29 of a drive shaft 28, the latter having a reduced end 30 which is normally drivingly connected with a central reception opening 4 bored through said first reel 2. Although not shown, this reception opening may preferably have a square section, if wanted. Thus, when the first motor 24 is energized, motion will be transmitted from the first motor to the first reel 2.

The first motor 24 is a reversible motor and therefore, when it is rotated in the reversed sense, the film feed is reversed and thus travels from the second reel to the first reel.

It should be mentioned that the drive shaft 28 is capable of axially sliding between its coupled position shown in FIG. 4 and its receded and uncoupled position, not shown, from the related reel bore 4.

More specifically, $K_1$ represents a small slider which is rigidly connected with drive shaft 28 by a steel band or the like connecting member shown only in a symbolized way with no reference symbol in FIG. 4. $K_2$ is a tension spring, one end of which is attached to a certain rigid stationary member, not shown, of the machine, while the opposite end of said tension spring is attached to said slider $K_1$, whereby the drive shaft 28 is urged towards its coupled position shown. $K_3$ represents a solenoid, the housing of which is stationarily mounted on the machine, while its plunger is mechanically connected with said slider $K_1$. By energization of the solenoid $K_3$, the slider is moved, together with drive shaft 28 and against the action of tension spring $K_2$, whereby the reduced shaft portion 30 of said drive shaft recedes from its coupling position and thus from the cooperating bore 4. Thus, the mechanical connection of drive shaft 28 is freed from the first reel 1.

Next, pressurizing or pressure-application means are provided, which comprise a freely rotatable pressure roller 31 that is adapted for application of pressure directed towards the film roll center when said means is brought into contact with the film "F". There are further provided peel-off means which comprise a peel-off roller 32 caused to rotate in the same direction as first reel 1 when the roller is brought into contact with the film "F", thus serving for peel-off of the leading film end from the film mass. It may be easily understood that said pressurizing means and said peel-off means can be replaced by respective belts or the like, if these are demanded to be used.

There is provided still further a mounting arm structure 33 which comprises a first arm 34 having the form of an elongated strip plate arranged in its entirety in a vertical plane; a second arm 35 extending in an angular direction relative to said first arm; and a connection arm 36 connecting the tip end of said first arm to the root end of said second arm. The root end of said first arm 34 is pivotally mounted through a pivot pin 37 on a stationary part, preferably a housing of the machine, although not shown. At the tip or operating end of said second arm 35, pressure roller 31 and peel-off roller 32 are arranged.

Figure 9:
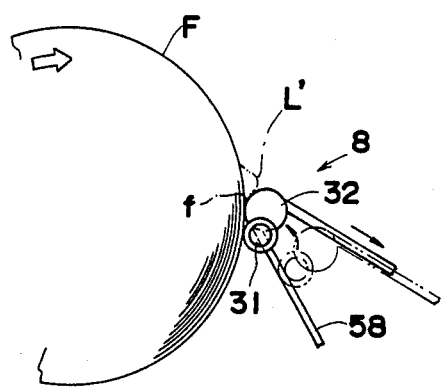
FIG. 9 is a schematic elevational view for the illustration of occasional formation of a small balloon at the film leader portion.
Figures 3, 8:
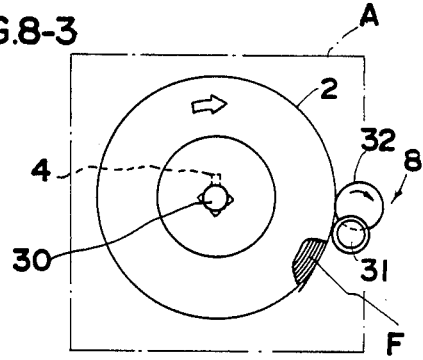

The arm structure 33 can swing to a certain angular degree and in the counter clockwise direction from its receded position shown in FIGS. 4 and 5, to its operating position shown in FIG. 9 and the like, and naturally swing back from the latter to the original position in the reverse direction. In the receded position, the operating end of second arm 35 will occupy a position in opposition to the feed-out opening of cartridge "A". At the operating position, however, the operating end of second arm 35 will advance through said cartridge opening 7 into the cartridge to a certain distance, until it is held at an opposite position to the film roll "F".

In the present embodiment so far shown and described, pressure roller 31 and peel-off roller 32 are mounted on the same arm structure 33. However, if wanted, these two rollers may be mounted on separate similar arm structures, respectively. Further, if further necessary, the arm structure 33 can be so modified to perform a linear reciprocating motion in place of the angular swinging motion as above referred to, although not shown. In this case, a solenoid or the like pressurizing means as at 38 may be preferably adopted. Naturally, various other mechanisms may be adopted and connected with the pressurizing mechanism 38.

PRESSURIZING MECHANISM 38

Pressurizing mechanism 38 operates the arm structure 33 to move towards the roll film mass "F" for bringing pressure roller 31 and peel-off roller 32 into pressure contact with the peripheral surface of said film mass.

Numeral 39 denotes a rotary solenoid having a pin 40 projecting therefrom. There is a hook member 41, one end of which is kept in engagement with said pin 40, while the opposite end is connected with first arm 34 of arm structure 33, and at the middle portion of the arm concerned.

With energization of rotary solenoid 39, arm structure 33 is caused to swing counter clockwise around the pivot pin 37 whereby pressure roller 31 and peel-off roller 32 are brought into contact with the peripheral film surface, as was set forth herein above.

On the contrary, when solenoid 39 is turned off, arm structure 33 will swing back reversely and to its original receded position.

Next, the mutual detailed arrangement of rollers 31 and 32 will be more specifically set forth hereinunder.

At one side surface of the operating end of second arm 35, more specifically on the front side thereof when seen in FIGS. 4 and 5, pressure rollers 31 is pivotably mounted. On the opposite or rear side of this second arm, a peel-off plate 43 is pivotably mounted by its root portion by means of a pivot pin 44 as shown in FIG. 6. The peel-off roller 32 being rotatably mounted in proximity of the tip end of said plate 43. These rollers 31 and 32 are arranged in a somewhat overlapping way when seen in the respective axial direction. Additionally, these rollers are arranged somewhat projecting from the tip end of second arm 35, and indeed, for the purpose of establishing a pressure contact with the peripheral surface of film mass "F", when the arm structure 33 has been brought to its operating position, as has been briefly described hereinbefore.

In the operating position, peel-off roller 32 is brought to a slightly upstream position in the film travel passage, in comparison with pressure roller 31. Therefore, these rollers are mounted in their mutually and slightly staggered positions when viewing along the film passage and towards the film mass. If desired, rollers 32 and 31 may be so arranged that they will be brought nearly at the same time into contact with the film.

In the following, the pressure-transmitting relationship in use of the pressure roller 31 and peel-off roller 32 will be described.

Now referring more specifically to FIG. 6, a coil spring 45 mounted on the pin 44 is kept by its one leg in pressure engagement with a pin 46 studded on peel-off plate 43 at its nearly central portion, while the opposite leg of this spring engages in a small opening 47 drilled through the second arm 35 in proximity of the operating end thereof. thus the peel-off plate 43 is normally urged to move substantially downwards in FIG. 6.

At the upper side edge of peel-off plate 43, a bent-up flange 48 is formed and kept in contact with upper edge 49 of second arm 35 nearly at its operating end and acts as a mechanical stop for defining the normal service position, as shown, of peel-off plate 43.

In the normal service position of peel-off plate 43, pressure roller 31 and peel-off roller 32 are off-set from each other in their mounted positions. When these rollers are brought into pressure contact with the film "F", contact of the peel-off rollers therewith will occur before contact by the feed roller. Thus, the peel-off plate carrying the peel-off roller will perform a backward swing from its normal service position and against the action of spring 45. In correspondence to the amount of this backward swing motion, the peel-off roller will apply a contacting pressure upon the film "F". This contacting pressure does not vary with variations in the wound film diameter, and thus remains always constant.

On the contrary, the pressure roller 31 will exert a variable strength pressure upon the film "F" in correspondence with the rotational momentum exerted by the rotary solenoid 39. As has already been set forth hereinbefore, the pressure force exerted by peel-off roller 32 is derived exclusively from the urging force of spring 45. Taking advantage of this feature in this embodiment, the pressure roller 31 always has a stronger pressure force in service than the peel-off roller 32. In addition, the roller 31 is designed to have a larger frictional coefficient than peel-off roller 32.

In this way, the interlayer frictional force appearing in the film roll "F" wound on the reel 1 becomes larger than that acting between peel-off roller 32 and the film surface. Thus, the interlayer friction in the film mass can be considerably increased by the application of the pressure developed by heavy pressure contact of pressure roller 31 with the periphery of the film, and the film mass is rotated in its feed-out direction without invitation of any roll-loosening.

Next, the rotational driving mode of peel-off roller 32 will be more specifically described.

Numeral 50 represents a second motor serving as the drive source which is so designed and arranged to start simultaneously with on-operation of rotary solenoid 39.

Figure 7:
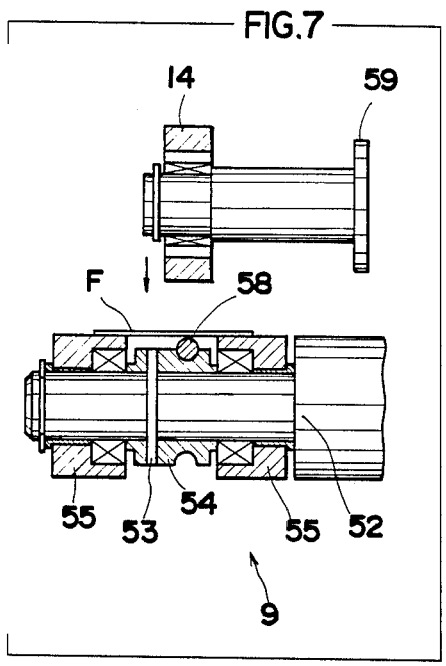
FIG. 7 is a partially sectioned plan view of drive rollers.

Motor shaft 51 of this second motor 50 is direct-coupled with a rotatable shaft 52, drive roller means 9 being fixedly mounted on the latter, as shown more specifically in the lower half of FIG. 7.

Drive roller means 9 comprises a drive pulley 54 which is mounted fixedly on the reduced end of rotatable shaft 52 by means of a laterally extending, pressure fit pin 53. At both sides of the drive pulley 54, there are provided free pulleys commonly denoted with 55 and rotatably mounted on the said reduced shaft end. These free pulleys serve to follow the film feed smoothly for prevention of occasional formation of film scratches.

An endless drive belt 58 is tensioned around drive pulley 54; intermediate pulley 57 and peel-off roller 32. The intermediate pulley 57 is mounted on a shaft extending between the foot end of second arm 35 and a bracket perpendicularly projecting outwards from connecting arm 36. Thus, rotation may be transmitted from second motor 50 to the drive belt 58 for rotation of peel-off roller 32.

It will be seen specifically from FIG. 7 that in proximity of the shaft 52, drive belt 58 and drive pulley 54 have their respective highest levels lower than the levels of free pulleys 55 and film "F" for allowing trouble-free pass of the latter between both reels 1 and 13.

Still next, the driving relationship of pressure roller 14 will be described.

As seen from the upper half of FIG. 7 in consideration of FIG. 4, pressure roller 14 is rotatably mounted at the tip end of a pressure arm 59 which is pivoted at 60 to a stationary member of the machine, not shown.

Plunger 62 of a solenoid 61 is mechanically connected through a link 63 and a pin 64 to pressure arm 59 at an intermediate point thereof. the solenoid 61 is so designed and arranged that it is turned on simultaneously with energization of rotary solenoid 39, while it is turned off when the film end "f" has reached spool 13 and turned therearound several times. For execution of such control, a timer may be used which is controlled by a control signal to be issued from encoder roller proper 10 as an example.

A coil spring 66 is connected to pressure arm 59 at an intermediate point between both ends thereof, for urging the arm to rotate clockwise in FIG. 4. The opposite end of this spring is connected through a pin 65 to a stationary part of the machine, not shown.

Figures 1, 8:
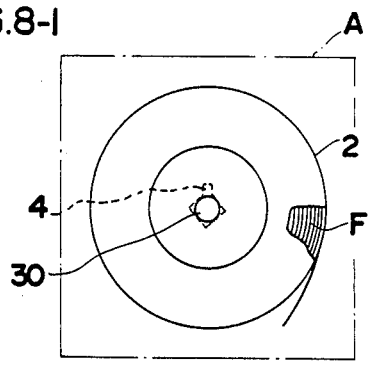
Figures 2, 8:
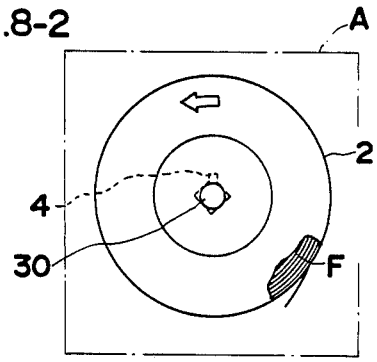

With energization of solenoid 61, pressure roller 14 is shifted counter clockwise from the position shown in FIGS. 1, 2 and 4 against the action of spring 66, and brought into pressure contact with drive belt 58 which is being driven by second motor 50. Thus, the roller 14 is caused to rotate by the running belt 58. When the film is conveyed on the drive belt, it will be fed by the combined action of pressure roller 14, drive roller 9 and drive belt 58 to the next following carrier system.

Next, the roll film carrier inspection means will be set forth.

As the inspection means, encoder roller 10 is employed in the present embodiment. The encoder roller comprises a roller proper and an encoder proper which is attached. fixedly and coaxially therewith. The encoder proper will generate a series of pulses in correspondence to the revolutions of the roller proper and thus in direct relation with the film passage length. More specifically, when the leading end "f" of film "F" has been fed out from the reel, and passes through the encoder roller pair 10; 15, operation of the encoder proper is initiated for generating a series of pulses. This pulse generation will be ceased when the film-carrying operation is stopped, or when the film end "f" is reversingly passed by encoder roller proper 10 in a film-rewinding step. The structure and operation of such inspection or sensing means are hingly well known and thus its detailed description has been omitted.

When the pulse generation ceases during the film-rewinding step, a termination thereof is inspected and sensed, said solenoid K3 is turned on, at first, based upon said sensing operation, and then, the rotary solenoid 39 of pressure application mechanism is turned on.

Next, the operation of the leading film end feed-out mechanism 8 will be set forth more in detail.

At first, a cartridge "A" containing a long film tape "F" wound up on reel 1 is charged in a roll film-charging section "H", FIG. 1, of a reader/printer or the like machine.

As shown at (1) of FIG. 8, the reduced end 30 of drive shaft 28 of reel drive mechanism 23 is brought into drive connection with reception opening 4 of the reel 1.

Next, for tightening occasionally loose film windings, a tigthening operation is carried out. More specifically as shown in FIG. 8-2, the reel 1 is subjected to a reversed or clockwise rotation by energizing the first motor 24 of reel drive mechanism 23 to rotate in its regular running direction, thereby the reel under consideration being rotated in the film-winding-up direction so as to tighten the film windings "F" thereon.

Upon completion of the foregoing film-tightening operation, the leading film end feed-out operation is initiated, as shown in FIG. 8-3.

At first in this step, first motor 24 of reel drive mechanism 23 is energized to rotate in the reverse, clockwise, running direction as shown by a small arrow, so as to release the outermost layer from the film mass "F".

At the same time, rotary solenoid 39 of pressurizing mechanism 38 is turned on, thereby the former being caused to rotate in clockwise direction and arm structure 33 swinging from its receded to operating position. Thus, the tip end of the second arm 35 of arm structure 33 is advanced through the feed-out opening 7 into cartridge "A" to such a position that it occupies an opposed position relative to the film surface.

Then, pressure roller 31 and peel-off roller 32 mounted on the operating end of second arm 35 are brought into contact with the film surface. More specifically, in the case of present embodiment, the peel-off roller is brought into contact in the above sense and in advance of the realization of a similar contacting operation of the pressure roller.

At this stage, peel-off roller 32 is being driven by second motor 50, simultaneously with rotary solenoid 39, and in clockise direction as in the same rotational direction of first reel 1 and film roll "F". On the contrary, the pressure roller 31 is rotated in the reverse or counter clockwise direction by its pressure contact with the rotating film surface.

Although the film mass "F" is rotated in the feed-out direction to release the outermost layer from the film mass, the leading film end "f" can reach the position of peel-off roller 32 without trouble, since the film mass rotates and creates a heavy increase of interlayer friction in the film mass.

Then, the leading film end "f" is subjected to peeling-off from the film mass under the action of peel-off roller 32, and thus said film end is conveyed to the outside.

In this stage of operation, pressure roller 31 and peel-off roller 32 are brought into contact with the slightly fed-out film, upon invasion through one and the same feedout opening 7 of cartridge "A" thereinto, in such a manner that the latter roller is positioned at a small upstream distance from the former roller. Thanks to the small distance between the rollers, the film pressing job and the film peel-off job are executed one after another with only a small time lag.

Thus, a liably formed film loop in close proximity of the leading film end "f", as shown in phantom line L' in FIG. 9, can be made to be as small as possible and on the order corresponding to the interroller distance. In this point, reference should be had to a conventional size film loop or balooning shown at "L" in FIG. 2.

The film leader portion, having a small loop as at L', can be smoothly fed out, with the tip end "f" positioned correctly in the leading mode onto the drive belt 58, upon being subjected to a peel-off action by the roller 32, and towards drive roller pair 9; 14.

Then, when the film leader wil be fed further and the leading film end "f" will pass through encoder roller pair 10; 15, rotary solenoid 39 is de-energized for returning the arm structure to its receded position, thereby both rollers 31 and 32 being separated from contact with the film.

Still further, when the leading film end arrives at second spool 13 and is wound thereon, by turns of spool 13 the solenoid 61 which has been energized with the on-operation of rotary solenoid 39, will become off. Second motor 50 is also de-energized.

Then, the film feed can optionally be performed in the regular or otherwise reverse direction as desired, by selected operation of reel 1 or spool 13.

In the foregoing embodiment, after execution of a preparatory film-wind-tightening operation, pressure roller 31 and peel-off roller 32 are brought into pressure contact with the film, simultaneously with clockwise rotation of the reel 1. If desired, however, such operational timing can be properly modified within the framework of the present invention. As an example, both rollers can be brought into pressure contact with the film when the film wind-tightening job is being carried into effect, and then, the peel-off roller may be forcibly driven simultaneously with reverse rotation of the reel 1.

As an alternative measure, the peel-off roller 32 can be brought into pressure contact with the film, while this roller is being positively driven.

The pressure roller 31 may be rubber-made. In addition, a round belting or flat belt band can be used in place of the pressure roller 31, if occasion may desire.

Next, the film-rewind operation will be described more in detail with reference to FIG. 10.

Figure 10:
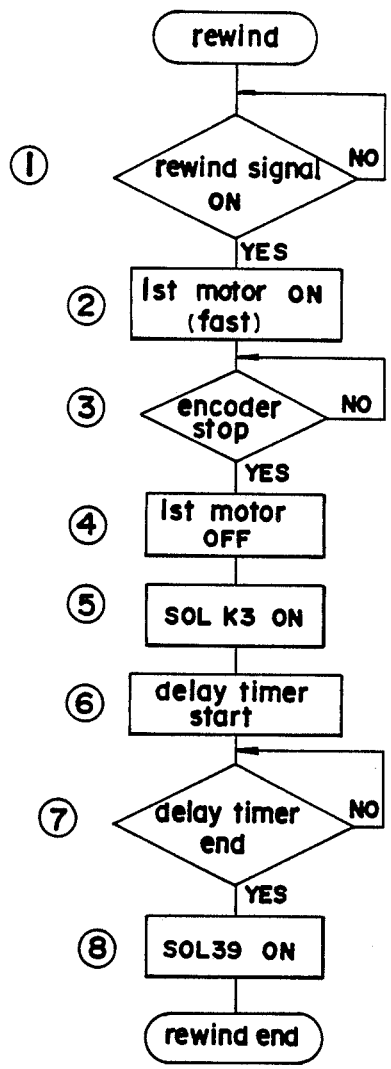
FIG. 10 is a flow chart for the illustration of the film-rewinding operation.

When a rewind-enabling signal is fed, as shown at step (1) in FIG. 10, from the operation control section, preferably a control panel, not shown, first motor 24 is energized and then, drive shaft 28 is caused to rotate at a high speed in the rewinding direction so as to rewind the film "F" onto the reel 1 of cartridge "A", as shown at step (2) in FIG. 10.

When the film has been substantially rewound and its end "f" has passed around and disengaged from the encoder roller proper 10, rotation of the latter is ceased, the pulse delivery therefrom being terminated, as schematically shown at (3) of FIG. 10.

In this way, when completion of the film-rewinding job has been sensed, a signal is delivered first to deenergize the first motor 24 for stopping the rewinding revolution thereof and for turning solenoid K3 to on. Thus the reduced end 30 of drive shaft 28 recedes from its coupled position to a free and disengaged position, as schematically shown at steps (4) and (5) in FIG. 10

When energization of solenoid $K_3$, a delay timer, not shown, is started and when the preset delay time has elapsed and thus "time-upped", it is assured that the reduced end portion 30 of drive shaft 28 has completely been receded to its uncoupled position, as schematically shown jointly at step (6) and (7) of FIG. 10.

Additionally, the delay timer can be, if desired, replaced by a corresponding mechanical means, such as, preferably, a damper.

Upon time-up of the delay relay, the pressurizing means are brought into operation. More specifically, rotary solenoid 39 of pressurizing mechanism 38 is energized, whereby arm structure 33 is caused to swing from its receded to operating position, as is schematically shown at step (8) in FIG. 10.

Then, pressure roller 31 and the like mounted on arm structure 33 will apply pressure onto the rewound film "F" on the reel 1 radially through the opening 7. Since, however, mechanical coupling between drive shaft 28 and reel 1 has been already released as was described above, the cartridge "A" will be partially pressed out from the charging section "H" and by the said radial pressure
transmitted thereto through film mass "F" and reel 1 to facilitate removal of the cartridge "A" from the reader/printer
.

In this way, the opposite side of the cartridge will be projectingly exposed from the charging section or container cavity.

In FIGS. 11-16, a modified film feed-out apparatus in the form of a second embodiment of the invention is shown. This second embodiment is adapted for either optional use of ANSI-standard type cartridge "A" or 3M (Minnesota Mining & Manufacturing)-standard type cartridge which is shown specifically in FIG. 16.

Since the basic structure of the present embodiment is substantially same with the first embodiment and thus contains similar parts employed therein, detailed description of common parts and elements employed in both will be dispensed with.

Figure 12:
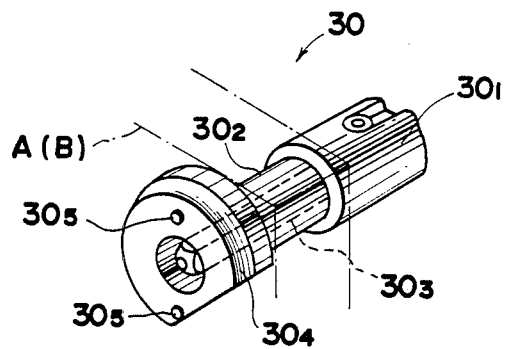
FIG. 12 is a perspective view of the reduced end part of the drive shaft contained in the film reel drive mechanism.
Figure 13:
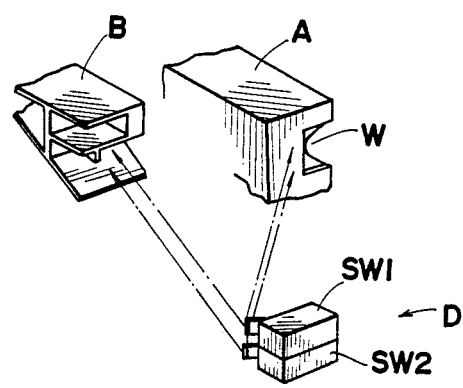
FIG. 13 is a perspective view of cartridge-discriminator means.

In the present embodiment, the reduced end 30 of drive shaft 28 of reel-drive mechanism 23 comprises, as shown in FIG. 12, an axially shiftable body 30-1; a cylindrical 3M-drive shaft 30-2 which is mounted axially slidably on the latter and adapted for driving a 3M-type cartridge "B"; and an ANSI-drive shaft 30-3 which is formed into a square shaft and slidably mounted in said 3M-drive shaft 30-2 and having its root end coupled with said shaft body 30-1 and adapted for driving the reel 2 mounted in ANSI-type cartridge "A".

A flange member 30-4 is fixedly mounted on the tip end of 3M-drive shaft 30-2, a pair of diametrally opposite pins 30-5 being fixedly attached to the outer surface of the flange member. During charging operation of the cartridge "B" into position, this flange member 30-4 is brought rotatingly into engagement with a circular recess 3' at the center of reel 1 (refer to FIG. 16). At the same time, the driving pins 30-5 are brought into engagement with corresponding reception openings 3 drilled into the bottom of said recess 3', for the purpose of providing the possibility of transmitting rotation from drive shaft 28 to the reel 1.

On the other hand, when the cartridge "A" has been charged in position, the flange member 30-4 of 3M-drive shaft 30-2 is brought into pressure contact with an central area of the side surface of the cartridge, thus being prevented from further axial advancing movement, while ANSI-drive shaft 30-3 can still further advance into the reel 2. In this way, the tip end of the shaft 30-3 is brought into driving and coupled connection with the central square opening 4 passing through reel 2. Thus, rotation can be transmitted from drive shaft 28 to reel 2.

ANSI-drive shaft 30-3 is so positioned and arranged that, when 3M-drive shaft 30-2 is in its operating service position, the former drive shaft can not project over the flange member 30-4.

Rotating driving mechanism 43 is brought as before into operation, when the ANSI-type cartridge "A" has been charged in position. This mechanism 43 is held in its off-service position, when the 3M-type cartridge "B" is being used, by interrupting the mechanical connection between motor shaft 51 and rotatable shaft 52, as an example. In this case, feed roller 9 and second pressure roller 32 are held in freely rotatable position.

Next, feed-out means such as feed-out roller 150 and the like will be described more in detail.

The feed-out means are brought into operable position, in the case when 3M-type cartridge "B" has been charged in position. In this case, feed-out roller 150 is used. However, an endless belt may be utilized in place of this roller, if wanted.

The feed-out roller 150 is extended with a tip end to the outside by means of reel drive mechanism 23 and adapted for performing pressure contacting operation relative to leader tape portion "f" wound on the periphery of reel 1 and under the action of an energizing mechanism 151. This roller 150 is caused to rotate in the reverse direction relative to the feed-out rotational direction of reel 1 under the action of a feed drive mechanism 152.

Now, structure and operation of the energizing mechanism 151 will be described more specifically.

The feed-out roller 150 is rotatably mounted on the operating end of first lever 153, the root end of the latter being pivotably mounted through pivot pin 154 on a stationary member of the machine, although not shown. First lever 153 is pivoted at its middle portion at the upper end of a connecting rod 156, while the lower end of this rod 155 is connected with a plunger 158 of solenoid 157. A coil spring 160 is tensioned between the first lever 153 at its middle portion and a pin 159 studded on a stationary member, preferably a machine frame, although not shown, and thus, the first lever is urged to rotate clockwise in FIG. 11.

Figure 11:
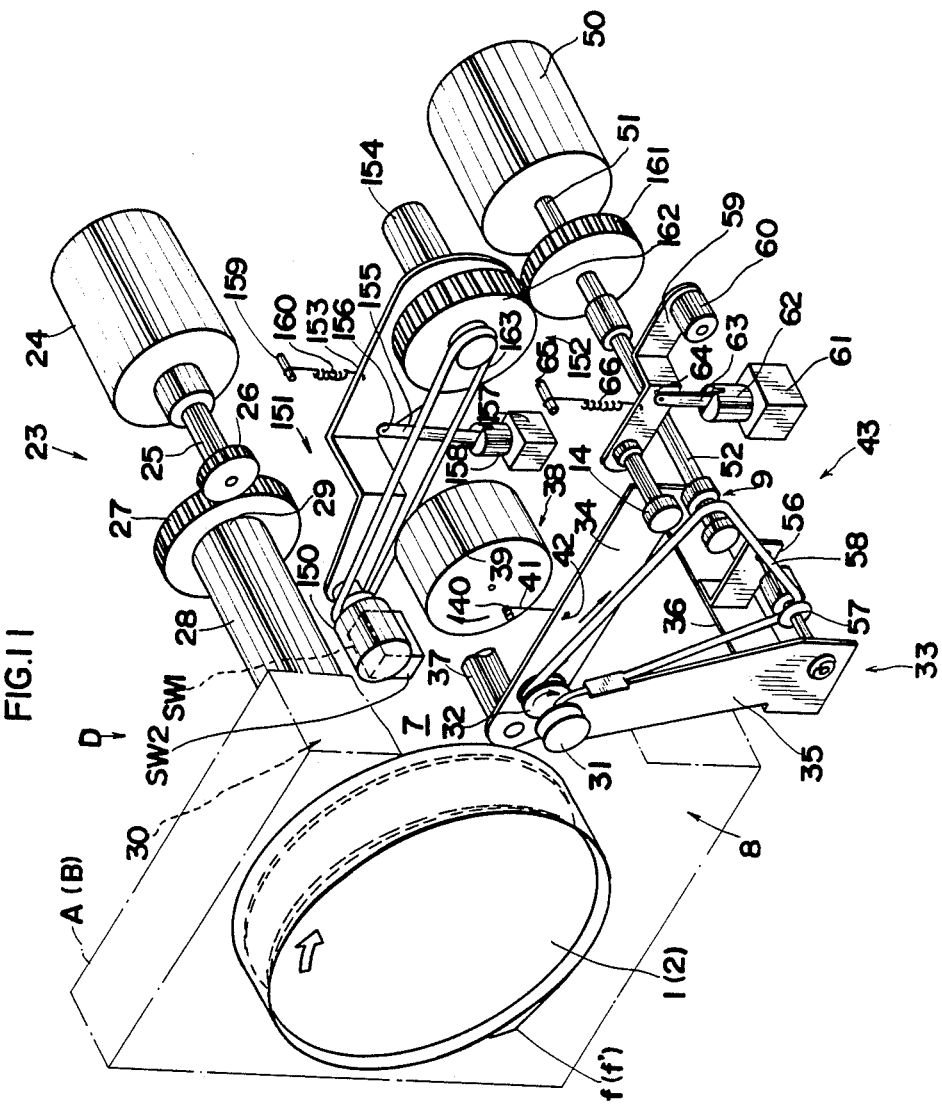
FIG. 11 is a similar view to FIG. 4, yet being modified for use in the second embodiment of the invention.

Upon energization of solenoid 157, first lever 153 is urged to rotate about the pivot 154 counter clockwise in FIG. 11 against the action of spring 160, and indeed, substantially downwards from its receded position shown in FIG. 11

The feed-out roller 150 performs a corresponding curved travel movement through cartridge window "W" and thus from its receded idle position to its service position is brought into pressure contact with the leader tape "f" of the film mass mounted on the peripheral surface of said reel 1 in the cartridge "B".

Upon de-energization of solenoid 157, first lever 153 is rotated clockwise, so as to return from its operating position to its receded off-service position, accompanying the feed-out roller 150.

Next, the structure and operation of the feed drive mechanism 152 will be described more specifically.

On the motor shaft 51 of second motor 50 acting as a drive power source, an output gear 161 is fixedly mounted and an input gear 162 meshes therewith. This gear 162 is rotatably mounted on the root end of first lever 153. An endless belt 163 is provided between the input gear 162 and a feed-out roller 150. Therefore, rotation is transmitted from second motor 50 through output gear 161 to input gear 162 to endless belt 163 and to film feed-out roller 150.

Next, the structure and operation of cartridge discriminating means "D" will be described in detail.

This discriminating means "D" contains a pair of sensor switches SW1 and SW2 arranged up and down with each other. In practice, however, these switches SW1 and SW2 are positioned on respective upper end corners of charged cartridges "A" and "B", in the manner as shown by a phantom chain line and a phantom chain-dotted line in FIG. 13, respectively, and in an opposed arrangement to each other.

Upper sensor switch SW1 is pressure-actuated by the charging-in-operation of either one of cartridge "A" or "B", while lower sensor switch SW2 is pressure-actuated by the charging-in-operation of cartridge "B" only.

Signals from sensor switches SW1 and SW2 are fed to an operation control microcomputer, not shown. Then, when sensor switch SW1 is turned to on, the charging of cartridge "A" or "B" is discriminated. With closure of sensor switch SW2, the class "A" or "B" of the charged cartridge is discriminated. Based upon the discriminated results, the occasionally necessary change-over operation between 3M-drive shaft 30-2 and ANSI-drive shaft 30-3; necessary shift and rotational drive of feed-out roller 150; and rotational drive of second pressure roller 32 and feed roller 9 will be properly controlled.

If occasion may desire, sensor switches SW1 and SW2 may be replaced by other similar sensing means, although not shown.

Next, arrangement and operation of pressure roller 14 will be more specifically described.

In case of ANSI-type cartridge "A" charged in position, the belt 58 is kept running and thus the pressure roller 14 is being rotated therewith and the leading film portion will be fed out onto the travelling belt 58 and then fed out to the following conveying system, by the combined action of pressure roller 14, belt 58 and feed roller 9.

On the other hand, when 3M-type cartridge "B" has been charged in position, the belt is not caused to run, as was described hereinabove, pressure roller 14 and feed roller 9 are left free.

Next, arrangement and function of the roll film feed-out device 8 will be more specifically described.

At first, a cartridge "A" or "B" containing reel 1 or 2 wound up with a long film strip "F" is charged into the roll film carrier section of a reader/printer or the like machine.

Then, existence of cartridge "A" or "B", as the case may be, is discriminated in its general class by means of switches SW1 and SW2 of cartridge discriminator "D".

The operational mode with the charge of 3M-type cartridge "B" will be described more specifically with reference to FIG. 14.

With reception of a signal fed from the cartridge discriminator "D", 3M-drive shaft 30-2 of reel drive mechanism 23 is caused to advance for introducing flange member 30-4 into the recess 3' of reel 1, thereby both drive pins 30-5 advance into respective reception openings 3 for establishing a mechanical coupling between the flange member and the reel 1. At this stage, first motor 24 is energized. These operations are performed while the rotational movement is being held. Upon completion of the above operation, the first motor 24 is provisionally deenergized.

Figures 1, 14:
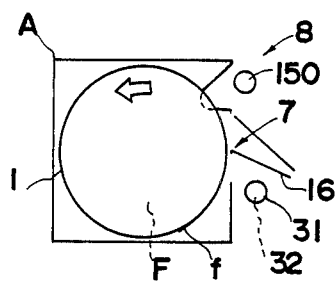

Next, a high speed film-tightening job is introduced, as schematically shown in FIG. 14-1. This operation is carried out for obviation of the occasionally existing loosely wound state of the film mass "F". More specifically, the first motor 24 of reel drive mechanism 23 is energized to rotate for several seconds, so as to rotate the reel 1 to a certain predetermined degree and in the reverse or counter clockwise direction. In this way, the film mass "F" wound on the reel 1 is subjected to an additional winding effect for wind-tightening direction.

Next, a low speed, film winding-tightening operation will be brought about, as schematically shown in FIG. 14-2. For this purpose, the rotational speed of first motor 24 is reduced for execution of a further film-tightening operation. This low speed film tightening operation is carried out with first and second pressure rollers 31; 32 kept in engagement with the peripheral film surface. In other words, rotary solenoid 39 is energized simultaneously with the initiation of the low speed film tightening operation, and thus the arm structure 33 is caused to swing from its receded off-service position shown in FIG. 1 to its operation position for bringing said both rollers 31; 32 into pressure contact with the film mass. In this case also, the pressure contact force of first pressure roller 31, depending upon the exerted rotary quantum by rotary solenoid 39, is preset stronger than the pressure contact force at second pressure roller 32 exerted thereon by its related spring. Therefore, substantially by the pressure force exerted by the first pressure roller 31, the internal interlayer friction force in the film mass is thereby further increased for intensifying the film wind tightening effect. At this stage, second pressure roller 32 is kept in pressure engagement with the peripheral surface of film mass, in freely rotatable state on account of the undriven position of the rotation drive mechanism 43. Therefore, both pressure rolls 31; 32 are caused to rotate in the reverse or clockwise direction by contact with the rotating film mass.

Upon completion of the film wind tightening operation so far described, first motor 24 is de-energized provisionally.

Next, as schematically shown in FIG. 14-3, the film leader feed-out operation will be initiated.

At first, first motor 24 is energized again, where the rotational direction thereof is the reverse. Therefore, reel 1 is rotated in clockwise direction, and the film mass is rotated in the feed-out direction so that the outermost layer thereof is released from the body of the film mass. Since first and second rollers 31; 32 are rotating in a counter clockwise direction and in the following mode, the leader tape "f" will become squeezed between the peripheral surface of spool 1 and the first and second pressure rollers and rotational movement will be transmitted successfully to the leader tape "f".

Since the leader tape "f" is made of a thick and hard strip and further, since the feed-out roller 150 is not kept in pressure contact with the latter at the upstream area in opposition to the window opening 7 of cartridge "B", the tip end of leader tape "f" will be caused to separate itself from the film mass surface by exclusive reliance of its own rigidity and will advances substantially in the tangential direction and positively towards the window opening 7 of cartridge "A". In this way, therefore, the tip end of leader tape "f" will be guided through window opening 7 to outside. At this stage, first pressure roller 31 and the like are yet kept in pressure contact with the film.

Then, the tip end of leader tape "f" led to the outside is guided further along a guide plate 16 and fed through now freely rotatable feed roller 9 and the pressure roller 14 now being kept in its operating position by the energized solenoid 61. Next, the tip end of the leader tape is guided to and between the roller pair 10; 15. The encoder roller proper 10 is rotated by the traveling leader tape itself, whereby a series of pulses are generated thereat for delivery therefrom.

Additionally, the tape end sensing operation may be performed by any suitable known device, to be optionally adopted in place of the encoder roller.

When the arrival of the tip end of leader tape "f" has been sensed in this way and thus the sensing signal pulses are delivered, the following three different operations may be brought about, as schematically hinted in FIG. 14-4.

At first, the first motor 24 becomes off and the revolution of the reel is made free therefrom.

Secondly, pressure contact of first pressure roller 31 and the like with film "F" will be released. In other words, rotary solenoid 39 becomes off and arm structure 33 will be returned from its operating position to its receded off-service position.

Thirdly, solenoid 157 of energizing mechanism 151 becomes on and feed-out roller 150 is brought into pressure contact with leader tape "f" around the outer periphery of reel 1. Further, second motor 50 of feed drive mechanism 152 becomes on, whereby feed-out roller 150 is driven to rotate in the opposite direction to the hitherto rotating direction of reel 1, which can thus continue its revolution. After this time point, the feed of leader tape "f" as well as the following body portion of the film will be performed exclusively by the feed-out roller 150.

With continued feed and carrying of the film "F", leader tape "f" will arrive at the spool 13 which is subjected at this stage to a high speed rotation under the action of a certain drive motor, not shown, however, attributed thereto. The the leader tape "f" is at first wound on this spool 13, whereby the running speed of film "F" is accelerated to meet with the high speed rotation of spool 13. Thus, the number of pulses delivered from encoder roller proper 10 will be correspondingly varied. In this way, the winding operation of leader tape "f" at the spool can be safely and positively sensed. With the sensing signal, at first, solenoid 157 is turned to off and feed-out roller 150 will be returned from its operating position to receding one. Secondly, second motor 50 will become off and feed-out roller 150 ceases its operation. Further, solenoid 61 becomes off. For carrying out these operation controls, a suitable timer means can be used, as easily understood by to any skilled person in the art.

Then, the film "F" can be fed in either regular or reverse direction by selective drive of either reel 1 or spool 13.

Next, the operation mode under use of the ANSI-type cartridge "A" charged in position will be set forth with reference to FIG. 15 and the like.

Upon delivery of an output signal from cartridge discriminator "D", the flange member 30-4 of reel drive mechanism 23 is brought into contact with the reel 2 at its central portion, thereby ANSI-drive shaft portion 30-3 being inserted into the central reception opening 4 on the reel for establishing a mechanical coupling therebetween, as was described hereinbefore.

Figures 1, 15:
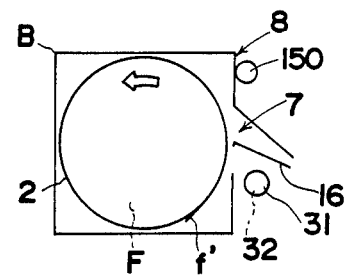
Figures 2, 14:
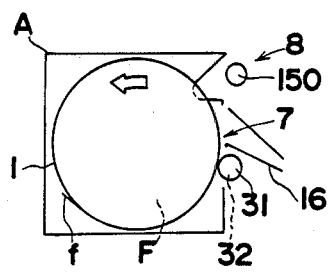
Figures 2, 15:
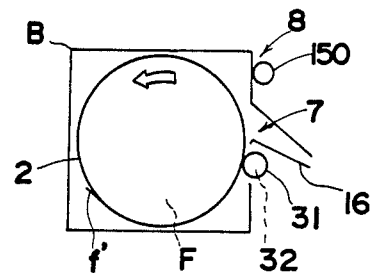
Figures 3, 14:
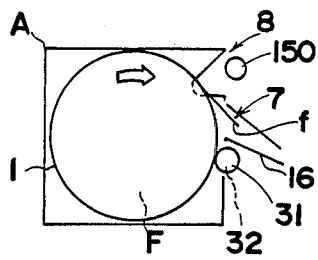
Figures 3, 15:
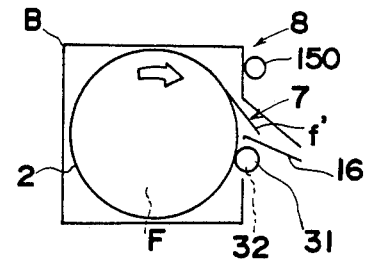
Figures 4, 14:
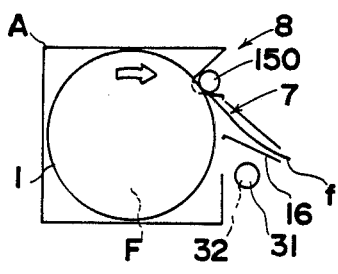
Figures 4, 15:
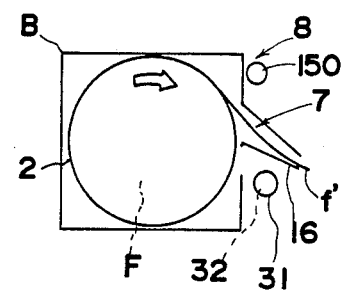
Figure 16:
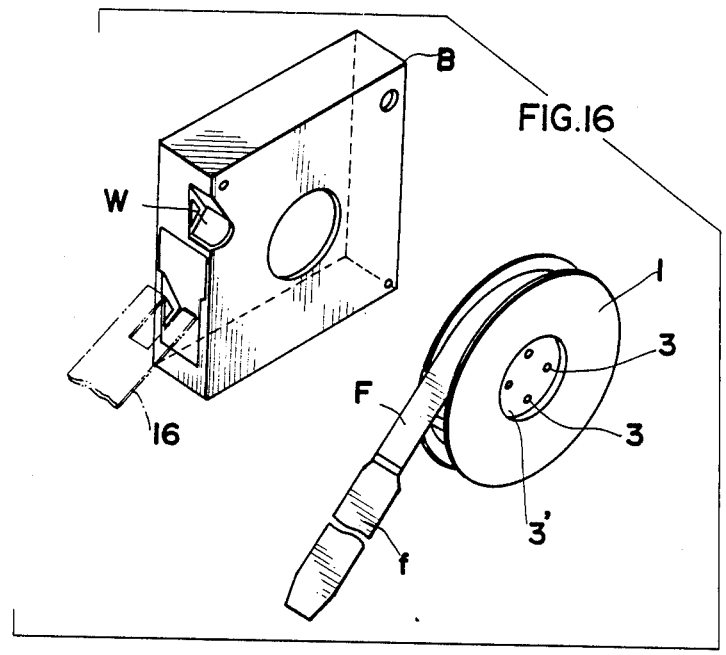
FIG. 16 is a similar view to FIG. 1, illustrating a 3M-type cartridge.

Then, film winding tightening operations will be executed, as shown schematically in FIGS. 15-1 and 15-2. These tightening operations are similar to those which have been described hereinbefore with reference to FIGS. 14-1 and 14-2.

Upon completion of these tightening operations, the first motor is provisionally turned to off, as was already referred to, and the desired feed-out of leading film end f' will be initiated.

Then, the first motor 24 is turned again to on, its revolutional direction at this stage being, however, in the reverse as was already referred to. Thus, the reel 1 will be rotated clockwise, whereby the film mass is rotated in its feed-out direction for release of the outermost film layer from the remaining mass.

At the same time, second motor 50 becomes on for actuation of the rotational drive mechanism 43 for letting the belt 58 run. Thus, the feed roller 9, the second pressure roller 32 which is in its freely rotatable state and kept in pressure engagement with the film "F" and pressure roller 14 which has been brought to its operating position by energization of solenoid 61, are all caused to rotate.

Since this second pressure roller 32 is being driven to rotate clockwise, leading film end f' is peeled off from the film mass under the action thereof, and then positively and accurately guided to pass through the window opening 7 to the outside. As already referred to, first pressure roller 31 is also kept in pressure engagement with the film surface, thus being caused to rotate counter clockwise and to apply a pressure force onto the film mass for tightening the latter, as was already referred to.

Since these first and second pressure rollers 31; 32 are arranged at a distance from each other, the balooning of the film at this specific area is kept to a minimum, as was already referred to.

The film leader portion having its leading end f' is further fed onto the belt 58 under the action of second pressure roller 32, thence further onto the running belt 58 under the combined action of feed roller 9 and pressure roller 14 for being subjected to further conveying action.

In this case, being different from the case of charging of said 3M- cartridge "B", a new mode operation would not be invited, even if the arrival of leading end f' is sensed at the encoder roll proper 10, thus the hitherto operation being nevertheless continued.

When the film "F" is further fed and carried away to the opposite spool 13 the latter will wind its leader end f' thereon, the fact being sensed out as before. And, upon delivery of this sensed signal, rotary solenoid 39 is de-energized at first for release of first and second pressure rollers 31; 32 from their pressure contacting job with film "F", and thus, to recede from their service to off-service position, as hinted in FIG. 15-4. Secondly, second motor 50 is de-energized and the rotational drive of second pressure roller 32; feed roller 9; pressure roller 14 and the like is ceased. Thirdly, solenoid 61 is de-energized.

Under these finally attained conditions, the film "F" can be conveyed normally or reversely as desired and between reel 1 and spool 13 by execution of optional drive of the reel or spool.

During this or other operation, feed-out roller 150 is always kept at its receded off-service position.

Further, a third embodiment will be set forth in detail with reference to FIGS. 17-21.

The leading film end feed-out apparatus contains feeder means comprising a feed roller 230 and the like, rotatable for feeding out the film "F", and peel-off means comprising a peel-off roller 240 and the like adapted for separating the leading film end "f" of the thus rotated film mass and further conveying the thus separated leading film portion to outside. As for these feeder means and peel-off means, suitable belting or other power transmitting means may be employed.

Next, the drive arm structure 250 that mounts feed roller 230 and peel-off roller 240 will be described in detail.

Numeral 260 represents a rotary solenoid, to which a pin 270 is fixedly attached. One end of a hook 280 is kept in engagement, while the opposite end 290 of the hook is connected to first arm 300 of drive arm structure 250 which comprises said first arm 300 formed into an elongated flat bar; an angularly extending second arm 310 therefrom; and a connection arm 340 between the tip end 320 of said first arm and the root end 330 of said second arm 310.

The root end 350 of first arm 300 is pivotably connected at 360 on the machine frame 370. The drive arm structure 250 is shown in its receded off-service position at FIGS. 17 and 18, wherein the tip or operating end 380 of second arm 310 is positioned at an opposite position to feed-out opening 7 of the cartridge "A". With energization of rotary solenoid 260, the drive arm structure 250 is caused to swing counter clockwise to a certain amount to its operating position, whereby the operating end 380 of second arm 310 advances into the cartridge "A" through its opening 7 for occupying an opposing position to the film "F".

With de-energization of rotary solenoid 260, the drive arm structure will recede from the operating position to off-service position.

Next, the positional relationship between feed-roller 230 and peel-off roller 240 will be described more in detail.

Figure 17:
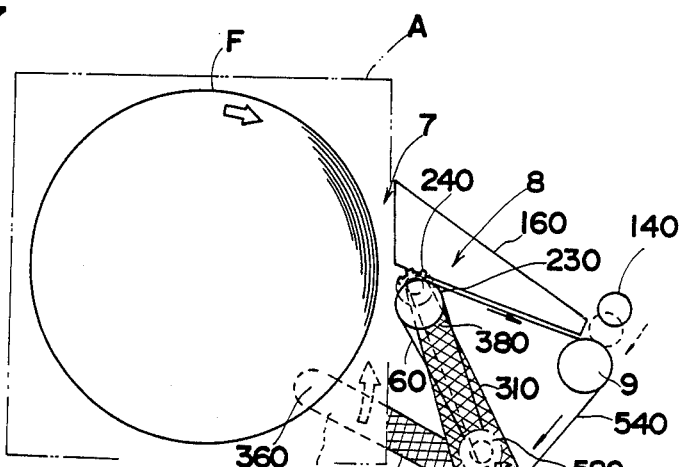
FIG. 17 is a similar view to FIG. 5, illustrating, however, a part of the third embodiment of the invention.
Figure 19:
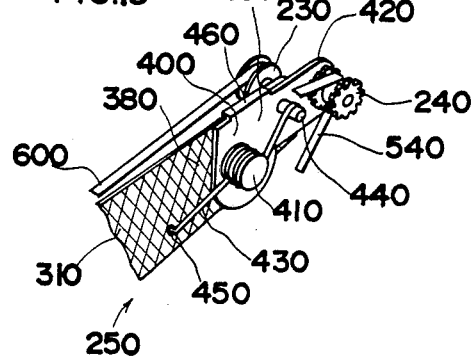
FIG. 19 is a perspective view of a feed roller 230 and a peel-off roller 240, and indeed, together with several related parts.
Figure 18:
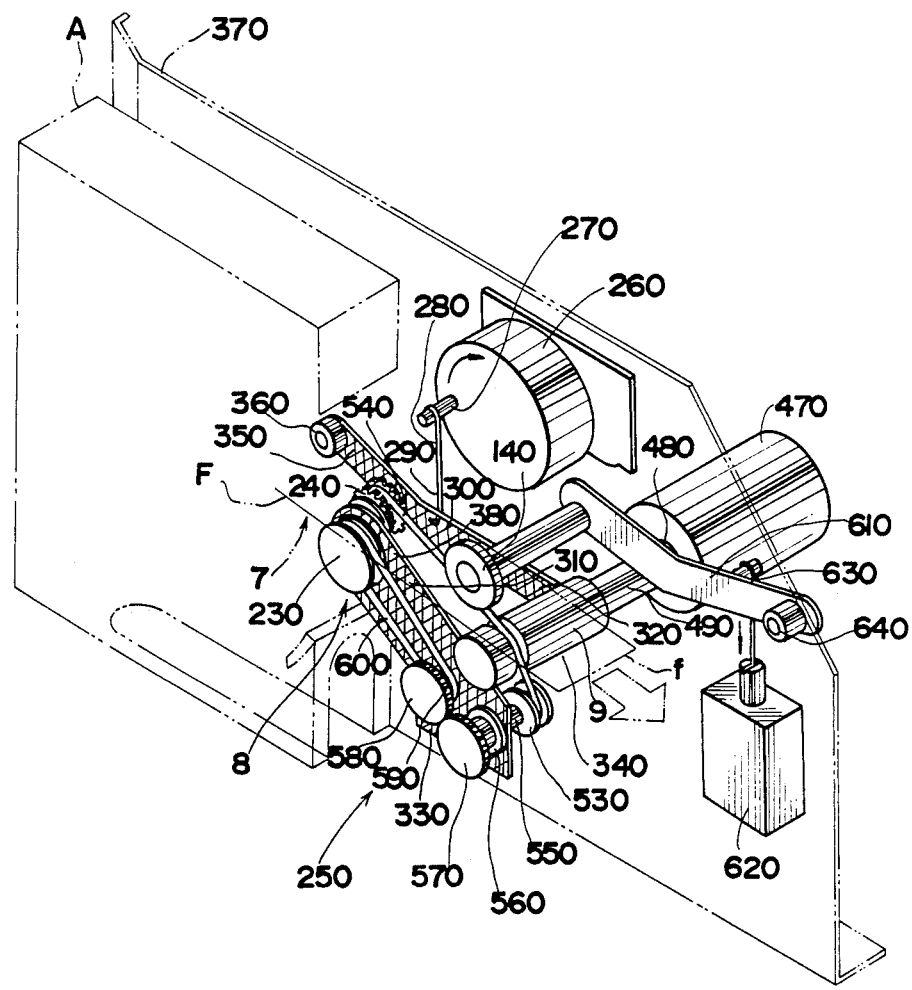
FIG. 18 is a substantially similar view to FIG. 4, yet illustrating the third embodiment.
Figure 20:
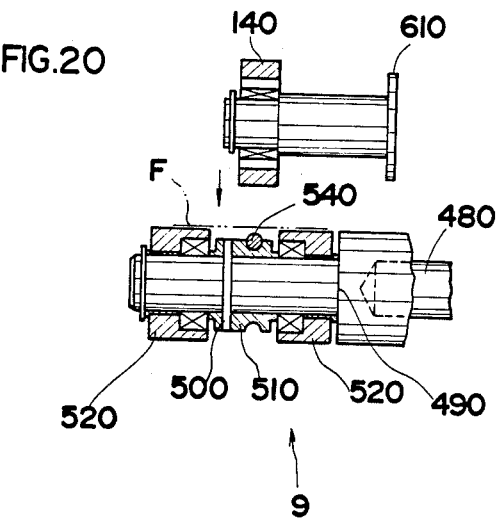
FIG. 20 is a partially sectioned elevational view of drive roller means adopted in the third embodiment.
Figure 21:
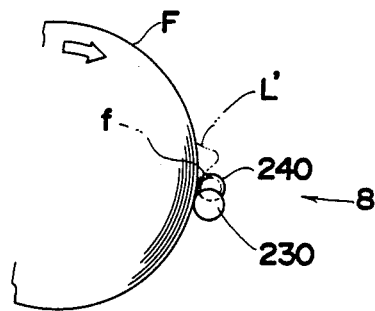
FIG. 21 is a similar view to FIG. 2, illustrating, however, an appearance of the third embodiment of the invention.

At one side (front side as seen in FIGS. 17 and 18) of operating end 380 of second arm 310 of the drive arm structure 250, the feed roller 230 is rotatably mounted. On the other hand, the root end 400 of peel-off plate 390 is pivotably mounted by a pin 410 at the opposite side (rear side as seen in FIGS. 17 and 19) of the operating end 380, while the operating or tip end 420 of peel-off plate 390 has the peel-off roller 240 mounted thereon. The feed roller 230 and peel-off roller 240, are arranged in close proximity to each other in such a manner that their projected areas are overlapped partially. When the drive arm structure 250 is positioned in its operating position, these two rollers are projecting from the tip or operating end 380 to a certain degree so that they may establish pressure engagement with the film "F". In this point, however, it should be noted that during this pressure engagement operation, the peel-off roller 240 will occupy an upstream point relative to the related peripheral surface of film mass "F" in comparison with the feed roller 230. In other words, the mounting points of these two rollers under consideration are offset slightly in a substantially up-and-down direction. Further, when observing in the pressurizing effect, it should be further noted that during the desired pressure-contact operation relative to the film mass "F", peel-off roller 240 is brought earlier into pressure contact with the film than feed roller 230. For this purpose, these two rollers are mounted in a staggered relation from each other (in other words slightly offset in the left- or righthand direction when seen in FIGS. 17 and 18). If occasion may desire, it would be possible to arrange these two rollers to perform their pressure contact operations simultaneously with each other.

Next, the pressurizing relationship between feed roller 230 and peel-off roller 240 onto the film surface will be described more specifically.

In the case of the present embodiment shown, a spring 430 is mounted with its body portion on a pin 410 serving for pivotal support of peel-off plate 390. One end of this spring is kept in pressure engagement with a pin 440 which is fixedly attached to said plate 390 substantially at its middle portion. The opposite end of said spring 430 is brought into engagement with a reception opening 450 drilled through the operation end 380 of second arm 310. In this way, peel-off plate 390 is urged by the spring to move substantially downwards in FIG. 19.

This plate 390 is formed with a bent-up flange 460 along its upper edge. This flange 460 will act as a kind of stop by establishing a pressure contact with the upper edge of operating end 380 of second arm 390, so as to define the normally occupying position of peel-off plate 390. In the normal position of the latter, peel-off roller 240 and feed roller 230 are mounted at mutually offset positions, as was referred to hereinbefore and it should be noted that in the pressure-engaging operation with film surface, the peel-off roller 240 is brought into contact with the film surface before the feed roller 230. In the execution of pressure contacting job, however, peel-off plate 390 carrying peel-off roller 240 will perform a rearwardly receding swing from its normal position and against the action of spring 430. In corresponding to this receding action, peel-off roller 240 exerts a pressure force onto the film surface. This acting pressure force will remain constant irrespective of variation in the wound diameter of the film.

On the contrary, feed roller 230 will exert a variable pressure force upon the film surface, depending upon variable rotational momentum provided by the rotary solenoid 260. As a result, the pressure contact force exerted by peel-off roller 240 is exclusively based upon the energizing energy of the spring 430. By utilization of this fact, the design and arrangement are such that feed roller 230 exerts rather stronger pressure force upon the film surface than peel-off roller 240. In addition, the feed roller 230 has a higher friction coefficient than the peel-off roller 240. Thus, even if these two rollers are rotated at a constant speed while they are held in pressure contact with the film surface, the rotational torque exerted by feed roller 230 thereupon will be higher than that exerted by peel-off roller 240, whereby the film mass is rotated safely and positively in the desired feed-out direction.

Next, the rotational drive mode of these two rollers 230; 240 under consideration will be set forth more specifically.

Numeral 470 represents a drive motor which becomes on simultaneously with energization of rotary solenoid 260.

Motor shaft 480 of the drive motor 470 is coupled with a rotation shaft 490, on which a drive roller assembly 9 is mounted, as shown in FIG. 18. Drive roller assembly 9 comprises a drive pulley 510 fixedly mounted on rotation shaft 490 by a fixing pin 500, and a pair of free-rotatable rollers 520, the latter being arranged at both sides of said drive pulley 510, as shown in the lower half of FIG. 20. These free rollers 520 will serve for the prevention of occasionally formed film-scratches and by their follower rotation.

An endless drive belt 540 is tensioned around said drive pulley 510; an intermediate pulley 530 rotatably mounted on the opposite or rear surface, facing towards machine frame 370, of the root end 330 of second arm 310; and said peel-off roller 240.

When seen in proximity of the rotation shaft 490, it is noted that the maximum height level defined by drive belt 540 and drive pulley 510 is lower than free rollers 520, for the purpose of avoiding interference troubles to the film transportation between reel 1 and spool 13.

It will be seen further that with energization of drive motor 470, the drive belt 540 can be driven without trouble and for rotary drive of peel-off roller 240.

On the other hand, the shaft 550 mounting the intermediate pulley 530 extends through an opening formed through the root end 330 of second arm 310, and rigidly mounts a further intermediate gear 570 appearing at the front side of the second arm 310, as seen in FIG. 18. This gear 570 meshes with a feed gear 580 which is rotatably mounted on the second arm 310. A further endless belt is tensioned between said feed roller 230 and the shaft 590 of feed gear 580.

Thus, rotation of the drive motor 470 will be transmitted through the intermediary of intermediate gear 570 and feed gear 580 in the reversed sense to feed roller 230. In this way, the rotation of feed roller 230 and that of peel-off roller 240 are in opposite directions to each other, and in addition, the rotational torque of feed roller 230 is larger than the peel-off roller 240. On the contrary, the rotational speed of peel-off roller 240 is higher than feed roller 230. It will be seen therefore, that the pressure engagement of rollers 230; 240, in combination with the aforementioned relationship among rotational torques, pressure forces and friction coefficients, the film "F" can be smoothly and positively fed out by the feed roller 230 in the desired running direction.

Next, the arrangement and function of the pressure contact roller 140 will be described more in detail.

This roller 140 is rotatably mounted on the operating end of pressure contact arm 610 while the root end of the latter is pivoted at 640 on the machine frame 370. Further, pressure contact arm 610 is connected at its middle portion through a hook member 630 with a solenoid 620.

This solenoid 620 is arranged to be energized simultaneously with the on-operation of rotary solenoid 260, but it is de-energized by appearance of the leading film end "f" at the spool 13.

With the energization of solenoid 620, pressure contact roller 140 is shifted from its full line position to its dotted line position shown in FIG. 17, and brought into pressure contact with drive belt 540 as well as drive pulley 510 comprised in drive roller assembly 9. Thus, the roller 140 is subjected to rotation by following with the drive belt 540. In this way, the film is fed out by the combined operation of peel-off roller 240 and drive belt 540, and thence further conveyed to the following conveying system by the combined operation of pressure contact roller 140, drive pulley 510 and drive belt 540 and the like.

Next, the operation of the leading film end feed-out apparatus 8 will be set forth in detail.

At first, a cartridge "A" containing a reel 1 wound up of a long film strip into a roll shown by "F" is charged into the roll film carrier section of a reader/printer, as an example. And then, the film roll tightening operation is carried out for absorbing occasionally existing loose film-windings. Next, rotary solenoid 260 is turned to on, thereby rotating in a clockwise direction. Then, drive arm assembly 250 will swing from its reached position counter clockwise to a certain extent, and to its operating position. Thus, the operating end 380 of second arm 310 comprised in drive arm assembly 250 is introduced through feed-out window opening 7 into the interior of the cartridge "A", thus occupying an opposing position to the film mass.

In correspondence thereto, feed roller 230 and peel-off roller 240 mounted at the operating end 380 of arm 310 are moved to their pressure contact position with the peripheral surface of the film mass. More specifically, in the shown embodiment, peel-off roller 240 will be brought into pressure contact before feed roller 230.

The rollers 230 and 240 are rotated, however, in counter clockwise and in clockwise directions respectively by the action of drive motor 470 which is turned to on with the energization of rotary solenoid 260.

By the pressure contact of feed roller 230 with the film mass "F", the latter will be rotated clockwise. Then, the leading end "f" of the rotating film mass will be peeled off from the latter under the action of peel-off roller 240 which is situated at a small upstream distance from the feed roller relative to the film mass rotating direction and brought into pressure contact with the latter, and forwarded thence to the outside.

At this stage the rollers 230 and 240 are positioned jointly in proximity of the same feed-out window opening 7 provided at the cartridge "A" and brought through the said opening 7 into pressure contact with the film mass in one-aside-another relationship . Thanks to the small separating distance between the pressure-contacted rollers on the film mass surface, the film feed operation and the film end peel-off operation are executed almost simultaneously, but in practice one after another. Therefore, practically and frequently encountered film ballooning formed at this specific area, as shown at L' in the drawings, may be kept at a minimum.

Then, the taken-out film leader portion with a minimum ballooning as at L', is conveyed further under the action of peel-off roller 240 onto the running drive conveyor 540 and thence to drive roller assembly 9.

Then, the film leader portion now in the form of a long strip will be further fed forward under combined action of drive roller 9 and pressure contact roller 14 and when the film leader end "f" passes over encoder roller 10 (refer to FIG. 3), rotary solenoid 260 becomes off, whereby drive arm assembly 250 is caused to return to its receded position and the rollers 230; 240 are separated from the film surface. Then, upon arrival of the leader film end "f" at the spool 13, solenoid 620 which has been in energized position with on-made rotary solenoid 260, will become off, whereby drive motor 470 is caused to stop. Thereafter, the film "F" can be fed optionally in its regular or reverse direction by selective driving of either reel 1 or spool 13.

In the case of the film leader end feed-out apparatus 8, since feed roller 230 and peel-off roller 240 may be positioned in proximity of one and the same feed-out window opening 7 of cartridge "A" and arranged in slightly separated operational positions, the power transmission mechanism from drive motor 470, the roller-mounting arm structure 250 and the like, and several related parts thereto, may be considerably simplified in structure and arrangement, without any loss of necessary working function and efficiency, which means naturally a remarkable progress in the art.

Although not specifically set forth hereinbefore, the drive structure 250 can be shifted to its operating position upon completion of the roll-film-rewinding job, as in the same manner adopted and realized in the foregoing first and second embodiments of the present invention, for the purpose of automatic pop-out of the once charged cartridge from the leader/printer or the like machine.

What is claimed is:

1. A film feed-out apparatus, comprising:
a roll film cartridge having a reel wound with a roll film therearound and an opening from which a leading end of the roll film is fed out;
reel drive means for rotating the reel in a first direction ;
first rotating means which is pressed against the surface of the film wound around the reel through said opening and is rotatable in said first direction for peeling off the leading end of the film; and
second rotating means which is pressed against the surface of the film wound around the reel through said opening and is rotatable by the film movement caused by the reel rotation, said second rotating means positioned adjacent to and downstream of said first rotating means in the direction of the film movement caused by the reel rotation.

2. A film feed-out apparatus as claimed in claim 13, further comprising means for shifting said first and second rotating means from a first position where said first and second rotating means are separate from the surface of the film to a second position where said first and second rotating means are in contact with the surface of the film.

3. A film feed-out apparatus as claimed in claim 2, wherein said shifting means shift said first and second rotating means from the first position to the second position in response to the reel rotation in the direction in which the film is slackened.

4. A film feed-out apparatus as calimed in claim 3, wherein said first rotating means starts rotation thereof after the first rotating means is in contact with the film surface.

5. A film feed-out apparatus as claimed in claim 3, wherein said first rotating means starts rotation thereof before the first rotating means is in contact with the film surface.

6. A film feed-out apparatus, comprising:
a roll film cartridge having a reel wound with a roll film therearound and an opening from which a leading end of the roll film is fed out;
first rotating means which is pressed against the film through said opening and is rotatable in a first direction, wherein said reel is rotated by the first rotating means in a second direction; and
second rotating means which is pressed against the film through said opening and is rotatable in the second direction which is opposite to said first direction, said second rotating means positioned adjacent to and upstream of said first rotating means in the direction in which the film is rotated, wherein the leading end of the film is peeled off by the rotation of the second rotating means.

7. A film feed-out apparatus as claimed in claim 6, wherein said first rotating means is contacted with the film with stronger pressure force than that of the second rotating means.

8. A film feed-out apparatus as claimed in claim 6, wherein said first and second rotating means include a high friction surface which is adapted to contact the film surface.

9. A film feed-out apparatus as claimed in claim 8, wherein a friction coefficient of said first rotating means is higher than that of said second rotating means.

10. A film feed-out apparatus comprising:
 a roll film cartridge having a reel wound with a roll film therearound and an opening from which the roll film is fed out;
 holding means for holding the cartridge to a predetermined position,
 feed out means contactable with the film via said opening for feeding the film out of said opening;
 pressing means for pressing said feed-out means against the film surface;
 means for rewinding the film on to the reel;
 deflecting means for detecting the completion of said rewinding operation; and,
 means for releasing said holding means and activating said pressing means in accordance with said detecting means, whereby the cartridge is ejected from said predetermined position after the completion of the rewinding operation.

* * * * *